(12) United States Patent
Smith et al.

(10) Patent No.: US 6,476,222 B2
(45) Date of Patent: Nov. 5, 2002

(54) PREPARATION OF HEAT STABLE PIGMENT VIOLET 23

(75) Inventors: Norman W. Smith, Cincinnati; Terrence R. Chamberlain, Montgomery; Barbara N. Berg, Hamilton; George McLaren, Maineville; Russell J. Schwartz, Montgomery, all of OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/755,494

(22) Filed: Jan. 5, 2001

(65) Prior Publication Data

US 2002/0091257 A1 Jul. 11, 2002

(51) Int. Cl.$^7$ ..................... C07D 265/28; C07D 265/34
(52) U.S. Cl. ......................................... 544/74
(58) Field of Search ........................... 544/74

(56) References Cited

U.S. PATENT DOCUMENTS

| | | | |
|---|---|---|---|
| 3,929,719 A | 12/1975 | Pugin et al. | 260/40 P |
| 4,253,839 A | 3/1981 | Spietschka et al. | 8/565 |
| 4,345,074 A | 8/1982 | Hufnagel et al. | 544/99 |
| 5,298,076 A | 3/1994 | Babler | 106/498 |
| 5,318,627 A | 6/1994 | Dietz et al. | 106/498 |
| 5,859,242 A | 1/1999 | Ikeda et al. | 544/74 |

FOREIGN PATENT DOCUMENTS

DE 946 560 8/1956

OTHER PUBLICATIONS

Hiraki et al., Chemical Abstracts, vol. 113:8305, 1990.*
Sakaguichi et al., Chemical Abstracts, vol. 98:5442.*
Sakaguchi et al., Chemical Abstracts, vol. 94:210297.*
Vilceanu et al., Chemical Abstracts, vol. 80:97322, 1974.*
Venkataraman, The Chemistry of Synthetic Dyes, vol. II, 1952, pp. 786–87.

* cited by examiner

Primary Examiner—Richard L. Raymond
(74) Attorney, Agent, or Firm—Sidney Persley

(57) ABSTRACT

A process for improving the heat stability of Pigment Violet 23 by conditioning crude Pigment Violet 23 in the presence of about 1 to 10 wt. % of Pigment Violet 23 by-products (1), (2) and (3).

12 Claims, No Drawings

PREPARATION OF HEAT STABLE PIGMENT VIOLET 23

FIELD OF THE INVENTION

The invention relates to an improved process for preparing a heat stable pigment violet 23.

BACKGROUND OF THE INVENTION

Pigment violet 23 has been known for decades and in the course of this time has acquired a very great importance because of its outstanding properties as a colorant. It is therefore manufactured on an industrial scale in large quantities. As long as the colorant has been known, the principal features of its manufacture have remained the same. It is typically synthesized by reacting chloranil (tetrachloro-p-benzoquinone) with 3-amino-9-ethylcarbazole to give 2,5-di-(9-ethylcarbazol-3-ylamino)-3,6-dichloro-1,4-benzoquinone. This is followed by cyclisation to give the pigment violet 23. (See Venkataraman, The Chemistry of Synthetic Dyes, Volume II (1952), pages 786 and 787). The following equations serves to illustrate the synthetic reaction scheme:

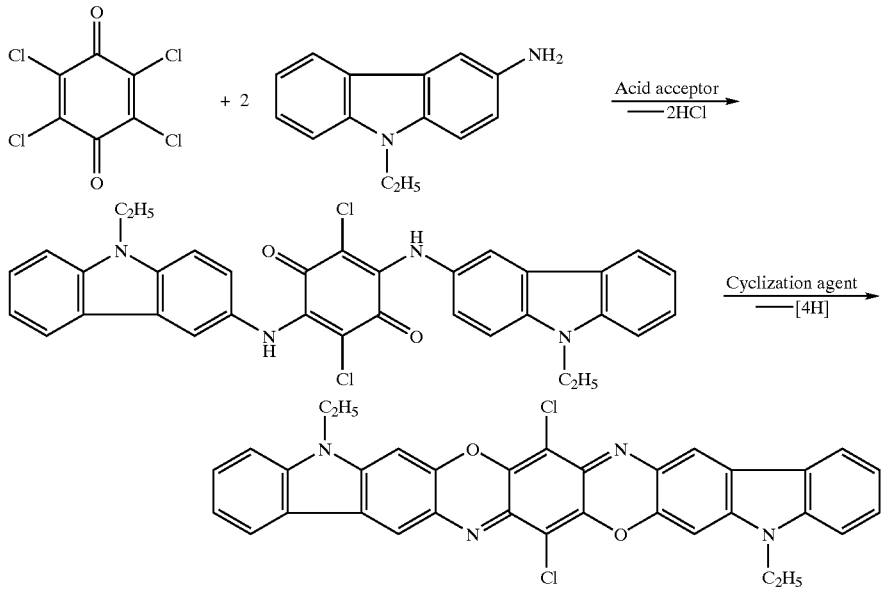

Pigment Violet 23

While many variations in the solvents used and conditions of this reaction have been disclosed, invariably, the reaction also leads to the formation of several by-products that the prior art deemed contaminants. These by-products are normally washed away from the crude pigment violet 23 before any conditioning (i.e. heat stabilizing) of such crude occurs.

SUMMARY OF THE INVENTION

The present invention provides an improvement in the process for the conditioning of pigment violet 23 having the formula:

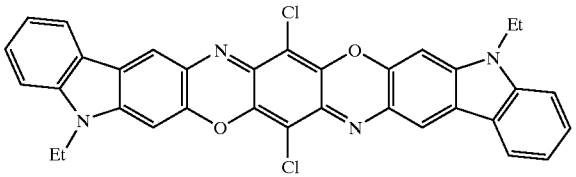

the improvement comprises carrying out said conditioning in the presence of about 1 to about 10 wt. %, preferably about 5 to 8 wt. %, relative to the weight of the crude pigment, of at least one compound selected from the group consisting of:

(1)

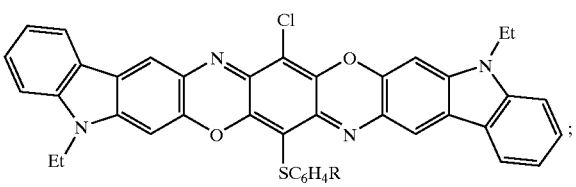

-continued (2)

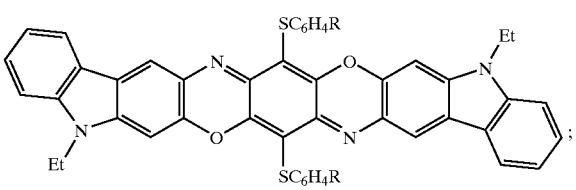

and (3)

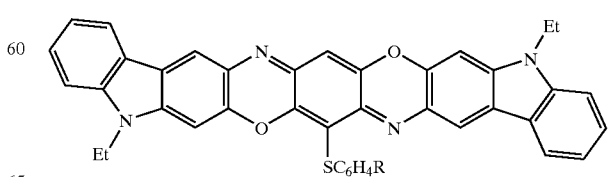

wherein each R is independently selected from either H or $CH_3$.

DETAILED DESCRIPTION OF THE INVENTION

It has been surprisingly found that the heat stability of pigment violet 23 in general and more specifically in plastics applications is increased significantly when a crude pigment violet 23 product is conditioned in the presence of about 1–10 wt. % of at least one of the following compounds:

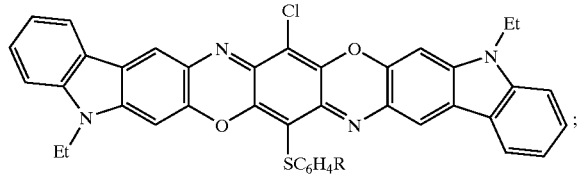

(1)

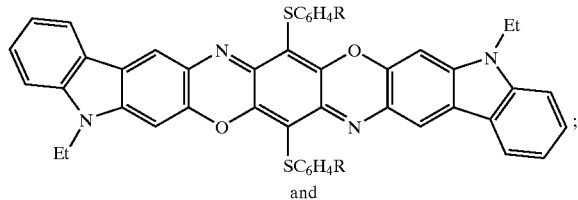

(2)

and

(3)

wherein each R is independently selected from either H or CH$_3$.

The conditioning of crude pigment violet 23 may be carried out by various processes such as by grinding the crude pigment in the presence of a grinding agent and an organic solvent. Preferably, the grinding agent is sodium chloride and the organic solvent is diethylene glycol.

Compounds 1, 2 and 3 are formed in final step in commercial preparation of pigment violet 23 crude which involves ring closure of the intermediate di-anil (4)

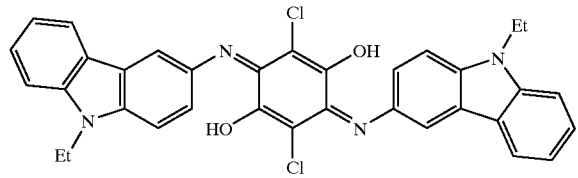

(4)

using benzenesulfonyl chloride or p-toluenesulfonyl chloride (or other arylsulfonyl chlorides).

It is well known that cyclization of the di-anil intermediate (4) during the synthesis of crude violet 23 results in the concurrent formation of by-product compounds (1), (2) and (3). More specifically, in compounds (1), (2) and (3), R is H when benzenesulfonyl chloride is employed as the cyclizing agent and R is CH$_3$, when p-toluenesulfonyl chloride is employed as the cyclizing agent. Alternatively, a mixture of (1), (2) and (3) can be produced wherein R is a mixture of H and CH$_3$. This is the case when a mixture of benzenesulfonyl chloride and p-toluenesulfonyl chloride are employed as cyclization agents. When aryl sulfonyl chlorides including other isomers of toluenesulfonyl chlorides, naphthalenesulfonyl chlorides, anthracenesulfonyl chlorides or other aryl systems are employed as the cyclization agents, the corresponding by-products are also formed and result in the same heat stabilizing effect.

The amount of these by-products [i.e. compounds (1), (2), and (3)] retained in the isolated crude product may be controlled by the washout procedure applied during the isolation/filtration process. Thus, rigorous washing with the hot reaction solvent will remove virtually all of the by-product compounds while more by-product compounds are produced under less rigorous washing conditions with preferably 1–10 wt. % retained. Alternatively, the appropriate level of (1), (2) or (3) by-product compounds or mixtures thereof (hereinafter referred to as "by-product mixture"), may be added to a purified crude sample prior to its conditioning. The presence of at least one of compounds (1), (2) or (3) in an amount of about 1–10 wt. % causes significant inhibition of recrystallization during the conditioning process. The result is that pigments possessing these levels of by-products (or impurities) also exhibit correspondingly higher surface areas.

For example, when a crude product containing <1 wt. % of at least one of compounds (1), (2) or (3) is conditioned, the resulting surface area is typically in the range of 85 to 95 m$^2$/g. By contrast, when a crude product containing from about 1 to 10 wt. %, preferably from about 5 to 8 wt. % of at least one of compounds (1), (2) or (3) is conditioned, the resulting surface area is typically in the range of 115 to 125 m$^2$/g. The superior heat stability of the latter product in plastic, compared to the former is also due to the presence of one or more of these compounds. Thus, crystalline growth (or recrystallization) of the pigment is significantly inhibited, during the high temperature processing necessary for the coloration of plastics.

The examples that follow demonstrate that the heat stability exhibited by plastic colored with the pigment prepared from a crude pigment violet 23 containing from 5 to 10 wt. % of at least one of compounds (1), (2) or (3) is superior to that of the equivalent plastic colored with the pigment prepared from crude pigment containing <1 wt. % of the same compound(s).

EXAMPLE 1

Preparation of the Carbazole Violet crude was carried out as described in U.S. Pat. No. 4,345,074 with the exception that upon completion of the synthetic process, the reaction mixture was cooled to 90° C. and filtered. The dichlorobenzene-saturated filter cake was slurried in methanol, re-filtered, washed with methanol then with water. After drying, the crude Carbazole Violet was conditioned (i.e. pigmented) by various well known procedures as described in U.S. Pat. No. 4,345,074. Such procedure resulted in a Pigment Violet 23 containing 5 to 10 wt. % of the mixture of (1), (2) and (3) which exhibited increased heat stability when dispersed in polyethylene or polypropylene, relative to the product generated by Example 2.

EXAMPLE 2

Comparative

Preparation of the Carbazole Violet crude was carried out as described in Example 1. The reaction mixture was cooled to 100° C., filtered hot, rinsed with o-dichloro-benzene, then warmed to 100° C. until the filtrates became colorless. The filter cake was then slurried in o-dichlorobenzene, warmed to 170° C. for 1 hour, then cooled to 100° C. and filtered. The filtrate was then rinsed with additional hot dichlorobenzene until the filtrate was colorless. It was then washed with methanol to remove dichlorobenzene, and finally with 50° C. water. The wet filtercake was dried in an oven. The crude was pigmented by various procedures as described in U.S. Pat. No. 4,345,074. These procedure resulted in a pigment containing<1 wt. % of a mixture of by-product compounds (1), (2) and (3) and exhibited decreased heat stability when dispersed in polyethylene or polypropylene relative to the product generated by Example 1.

In a high-speed, high-shear/temperature polypropylene dispersion system, the product (Example 2) from the pigment containing<1 wt. % of at least one of compounds (1), (2) or (3) exhibited a loss in color strength of approximately 10% when compared, under identical conditions, to the equivalent product (Example 1) prepared from the pigment containing 5 to 10 wt. % of at least one of compounds (1), (2) or (3), during a processing period of 30 seconds to 180 seconds. Additionally, the coloristic properties of the product in Example 2 were more adversely affected. Specifically, Da and Db of the product in Example 2 changed by −2.5 units and +1.4 units, respectively, relative to the corresponding color coordinates of the product in Example 1. Therefore, during the process of plastic compounding, a trend is observed. The products obtained from the less stabilized pigments were greener, yellower and weaker and therefore less desirable commercially than the products obtained from the more stabilized pigments.

EXAMPLE 3

One part of a mixture of by-product compounds (1), (2) and (3) were added to nine parts of a purified carbazole violet crude. To this was added 100 parts of sodium chloride grinding agent and 18 parts of diethylene glycol. The material was mixed in a kneader for 5 hours, then slurried in 1000 parts of water at 85 to 90° C. for one hour. The slurry was filtered, rinsed with water, then oven dried. The resulting pigment had increased heat stability comparable to that of the product from Example 1.

The invention has been described in terms of preferred embodiments thereof, but is more broadly applicable as will be understood by those skilled in the art. The scope of the invention is only limited by the following claims.

What is claimed is:

1. A process for improving the heat stability of Pigment Violet 23 having the formula:

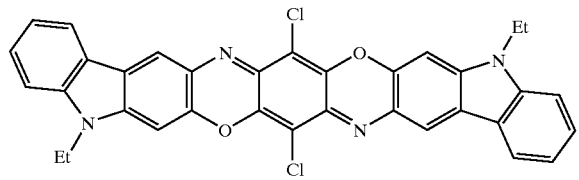

comprising conditioning said pigment in the presence of about 1 to about 10 wt. %, relative to the weight of the crude pigment, of at least one compound selected from the group consisting of:

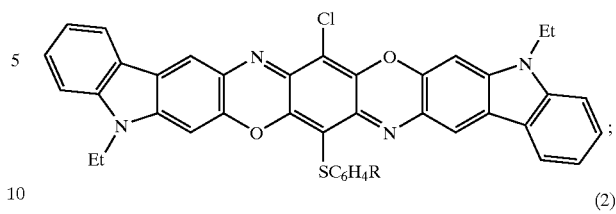

(1)

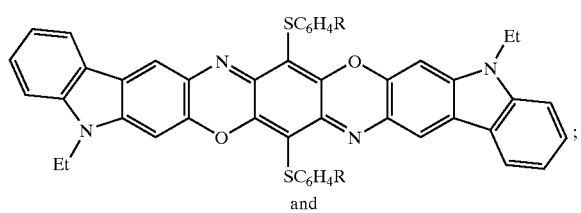

(2)

and

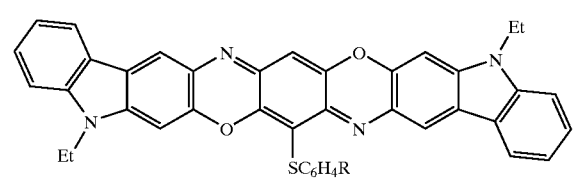

(3)

wherein each R is independently selected from either H or $CH_3$.

2. The process of claim 1 wherein the conditioning is carried out by grinding the crude pigment in the presence of a grinding agent and an organic solvent.

3. The process of claim 2 wherein the grinding agent is sodium chloride.

4. The process of claim 2 wherein the organic solvent is diethylene glycol.

5. The process of claim 1, wherein said conditioning is carried out in the presence of about 5 to 8 wt. % of at least one of said compounds (1), (2) or (3).

6. A process for forming Pigment Violet 23 of structural formula (I)

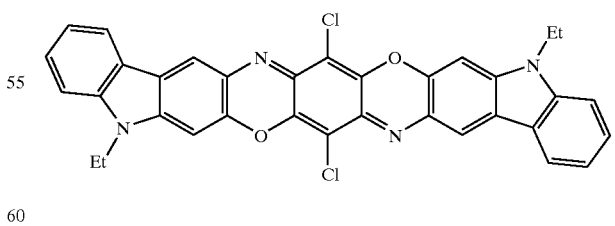

(I)

having a specific surface area of from about 115 $m^2/g$ to about 125 $m^2/g$, and heat stability, the process comprising conditioning a crude pigment of structural formula (I) in the presence of from about 1 to about 10 weight percent, based on the weight of the crude pigment, of at least one compound selected from the group consisting of:

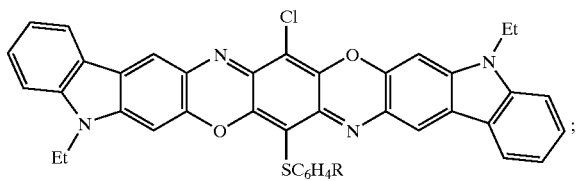

(1)

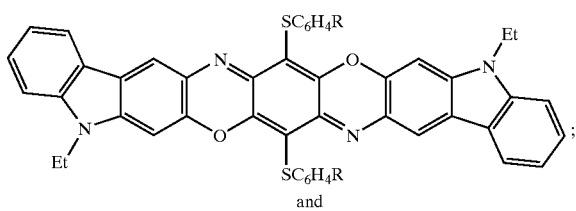

(2)

and

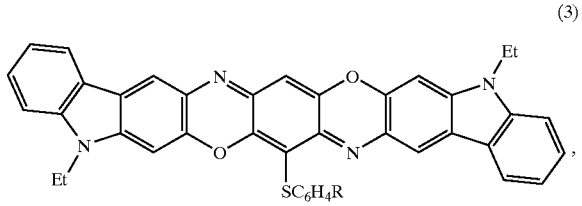

(3)

wherein each R is independently H or CH$_3$.
to form a heat-stabilized product pigment having the desired specific surface area.

7. The process of claim 6, wherein the conditioning is carried out by grinding the crude pigment in the presence of a grinding agent and an organic solvent.

8. The process of claim 7, wherein the grinding agent is sodium chloride.

9. The process of claim 7, wherein the organic solvent is diethylene glycol.

10. The process of claim 6, wherein the conditioning is performed in the presence of from about 5 weight percent to about 8 weight percent), based on the weight of the crude pigment, of the at least one compound selected from the group of compounds (1)–(3).

11. Heat-stable Pigment Violet 23, prepared according to the process of claim 6.

12. Pigment Violet 23 of structural formula (I):

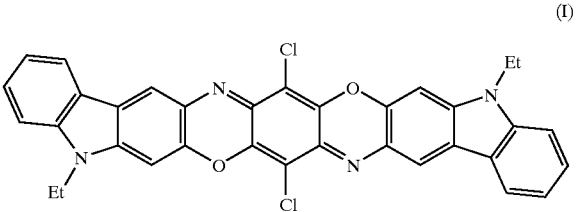

(I)

having a specific surface area of from about 115 m$^2$/g to about 125 m$^2$/g, and heat stability.

* * * * *